United States Patent [19]

Thompson

[11] 4,321,866
[45] Mar. 30, 1982

[54] BREATHER BAG APPARATUS

[76] Inventor: Andy L. Thompson, Rte. 2, Courtland, Kans. 66939

[21] Appl. No.: 204,458

[22] Filed: Nov. 6, 1980

[51] Int. Cl.³ .................... A01F 25/14; A01F 25/22
[52] U.S. Cl. .......................... 99/646 S; 220/85 B; 220/85 VS
[58] Field of Search ............. 99/646 R, 646 S, 646 C, 99/485, 467, 472, 473; 220/85 R, 85 B, 85 VS; 52/29, 39, 192

[56] References Cited

U.S. PATENT DOCUMENTS

| | | | |
|---|---|---|---|
| 2,899,884 | 8/1959 | Herbruck | 99/646 S |
| 3,193,058 | 7/1965 | Ebbinghaus | 99/646 S |
| 3,494,274 | 2/1970 | Evers | 99/646 S |
| 3,510,319 | 5/1970 | Whitaker | 220/85 VS |
| 3,630,001 | 12/1971 | Hamerski | 99/646 S |
| 3,888,288 | 6/1975 | Hickle | 99/646 S |
| 3,969,997 | 7/1976 | Haag | 99/646 S |
| 4,129,069 | 12/1978 | Thompson | 99/646 S |

Primary Examiner—Robert W. Jenkins
Attorney, Agent, or Firm—Phillip A. Rein

[57] ABSTRACT

This invention is an improved breather bag apparatus used with a sealed storage bin such as a silo allowing for expansion and contraction of the air within the sealed structure due to changes in the air temperature in the sealed storage bin. As a material with a high moisture content is normally being stored, the connector pipe between the improved breather bag structure is inclined back into the storage bin for any condensed fluid to flow back into the storage bin to keep the stored material moist. This improved breather bag apparatus is mountable on the sidewall of an existing silo within a protector shell member and having a bag member that is readily observable from adjacent the silo to ascertain whether such is operating properly and having a drain valve to release fluid from the bag member. The protector shell member is provided with a bottom wall with an access door to allow one entrance to the drain valve for operation thereof. Also, a special bag support assembly is mounted in the protector shell member and operates to hold the bag member in the proper shape.

7 Claims, 5 Drawing Figures

BREATHER BAG APPARATUS

PRIOR ART

It is known in the prior art to provide breather bag devices by regulate pressure within a sealed container. These devices expand and contract due to temperature changes to expand and contract any air therein plus any gases produced by material stored in the sealed container. Such prior art structures are shown by the following patents:

| U.S. PAT. NO. | INVENTOR | ISSUE DATE |
| --- | --- | --- |
| 2,899,884 | Herbruck | 8-18-59 |
| 3,193,058 | Ebbinghaus | 7-6-65 |
| 3,318,229 | Hansen, Jr. | 5-9-67 |
| 3,494,274 | Evers | 2-10-70 |
| 3,510,319 | Whitaker | 5-5-70 |
| 3,528,360 | Broberg | 9-15-70 |
| 3,630,001 | Hamerski | 12-28-71 |
| 4,129,069 | Thompson | 12-12-78 |

Most of the patents teach a bag structure that is built into the original storage container such as the Herbruck, Ebbinghaus, Hansen, Jr., Whitaker, and the Broberg references.

It is noted that the Evers patent teaches an elaborate outer housing having breather bags mounted therein. Similarly, the Hamerski structure has an outer housing with a diaphragm member to allow for expansion and contraction of gases therein.

Also, the applicant's own patent cited herein is pertinent in showing the basic elements of our invention but not having the additional novel elements set forth in this invention. The applicant's invention is novel in (1) being easily packaged for shipping and assembled at the usage site; (2) connectable to existing silos to provide a breather bag feature; (3) having an open housing so the condition of the breather bag member can be readily observed; (4) having a new and novel breather bag support assembly; and (5) a cover structure over the lower end of the open housing to prevent birds, squirrels, etc. from access and damage to the breather bag.

PREFERRED EMBODIMENT OF THE INVENTION

In one preferred embodiment of this invention, an improved breather bag apparatus is provided that is readily connected to the sidewall of a storage silo structure. The improved breather bag apparatus includes a bag assembly mounted with in a bag mounting assembly and connected from the bag assembly to the silo structure by a conduit connector assembly. The bag assembly includes a flexible, airtight bag member having an upper inlet opening; an upper support and connector flange about an upper end of the bag member; and a drain valve connected to a lower end of the bag member to selectively drain fluid therefrom. The bag mounting assembly includes (1) a support connector assembly connected to the inlet opening of the bag member and the conduit connector assembly; (2) a protector shell member mounted about the bag assembly and connected to the support connector assembly; (3) a support bracket assembly is connected to the protector shell member and a sidewall of the silo structure to add sufficient rigidity; and (4) a bag support assembly is mounted about an upper inner periphery of the protector shell member and connected to the bag member for proper support thereof. The support connector assembly includes a central support tube having connected thereto (1) a top conduit support member to connect to the conduit connector assembly; (2) a central shell support flange connected to the protector shell member; and (3) a lower bag support member to connect to the upper inlet opening of the bag member so as to direct gases and possible condensed fluids from the bag member through the support tube and conduit connector assembly to the silo structure. The protector shell member is of a bottle shape and surrounds the bag member. The protector shell member is provided with a bottom wall that permits access to the drain valve and observation of the shape of the bag member while preventing birds, squirrels, etc. access to the bag member to prevent damage thereto. The support bracket assembly includes connector arms, support straps, and mounting brackets to support the protector shell member adjacent the silo structure. The conduit connector assembly includes an inclined conduit member having connector flanges at opposite ends and a plurality of nut and bolt members are used to connect one connector flange to the conduit support flange of the support connector member and the other connector flange is secured to the silo structure about an inlet opening or hole. The conduit member acts to permit free flow of air and gases between the silo structure and the bag member to permit expansion and contraction thereof. The conduit member has a major portion inclined downwardly toward the silo structure so that any condensed fluid therein flows back into the silo structure.

OBJECTS OF THE INVENTION

One object of this invention is to provide an improved breather bag apparatus that is simple in construction and easily assembled and connected to existing silo structures.

One other object of this invention is to provide an improved breather bag apparatus having an outer protector shell member enclosing and protecting a flexible, expandable bag member.

Another object of this invention is to provide an improved breather bag apparatus having a breather bag member enclosed by a protector shell member, and the shell member has a bottom wall whereby the condition of the breather bag member is readily observed but prevents access thereto by birds, squirrels, etc.

A further object of this invention is to provide an improved breather bag apparatus with a bag support assembly to hold a breather bag member in the proper shape and connected to a silo structure by a conduit member that directs any fluid condensed therein into the silo structure.

Still, one further object of this invention is to provide an improved breather bag apparatus that is durable in construction, easy to assembly and connect to an existing silo structure, and dependable in operation.

Various other objects, advantages, and features of the invention will become apparent to those skilled in the art from the following discussion, taken in conjunction with the accompanying drawings, in which:

FIGURES OF THE INVENTION

Figure 1:
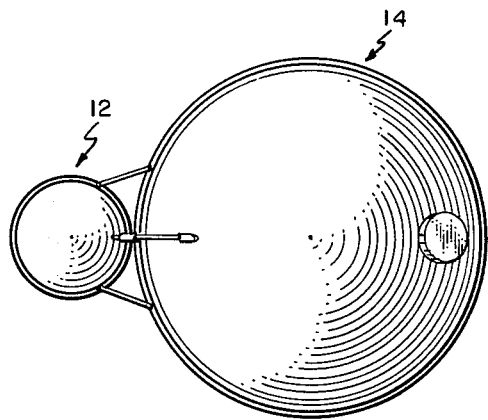
FIG. 1 is a top plan view of a silo structure having an improved breather bag apparatus of this invention connected thereto.

The following is a discussion and description of preferred specific embodiments of the new improved breather bag apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

In referring to the drawings in detail and, in particular to FIG. 1, a improved breather bag apparatus of this invention, indicated at 12, is illustrated as connected to a silo structure 14 which is supported on a ground surface 16.

The silo structure 14 is of a conventional nature having a bottom wall 18, a cylindrical sidewall 20, and an integral, curved top wall 22. The sidewall 20 is formed with a discharge tube 24 to remove material, such as corn, wheat, etc. from the silo structure 14. The top wall 22 is formed with an inlet opening 28 covered with an airtight cap 30 through which the material is added to the silo structure 14. A second opening 32 is formed in the top wall 22 and connected to the breather bag apparatus 12 in a manner to be explained.

The improved breather bag apparatus 12 includes a bag assembly 34 mounted within a bag mounting assembly 36 which, in turn, is connected to the silo structure 14 by a conduit connector assembly 38. The bag assembly 34 consists of a bag member 40 preferably constucted of an airtight nylon material. The bag member 40 resembles an oblong balloon having a bottom wall 42 integral with a sidewall 44 which, in turn, is integral with a top wall 46. The junction of the sidwall 44 with the top wall 46 is formed with a connector flange 45 having spaced holes 47 surrounded and sealed by respective grommet members 51 for reasons to be explained. The uppermost portion of the top wall 46 defines an inlet opening 48 which is secured to a portion of the bag mounting assembly 36. The bottom wall 42 has a drainage valve 49 which can be opened to drain any accumulated fluids from the bag member 40.

Figure 2:
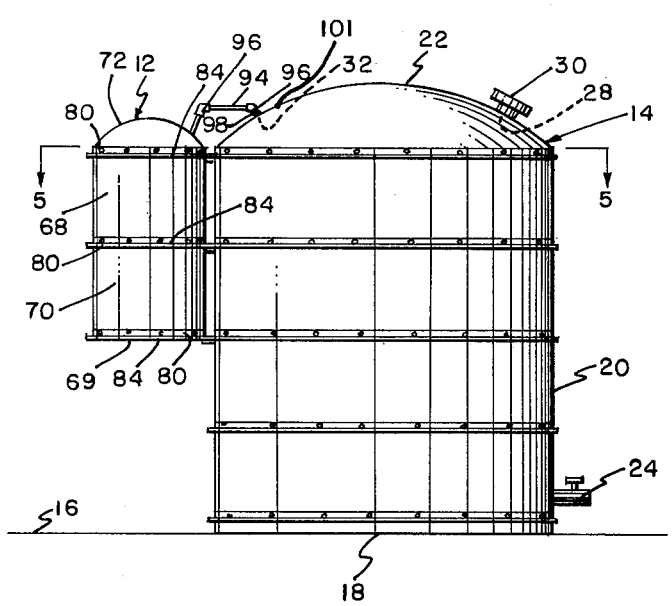
FIG. 2 is an enlarged side elevational view of the improved breather bag apparatus and the silo structure.
Figure 3:
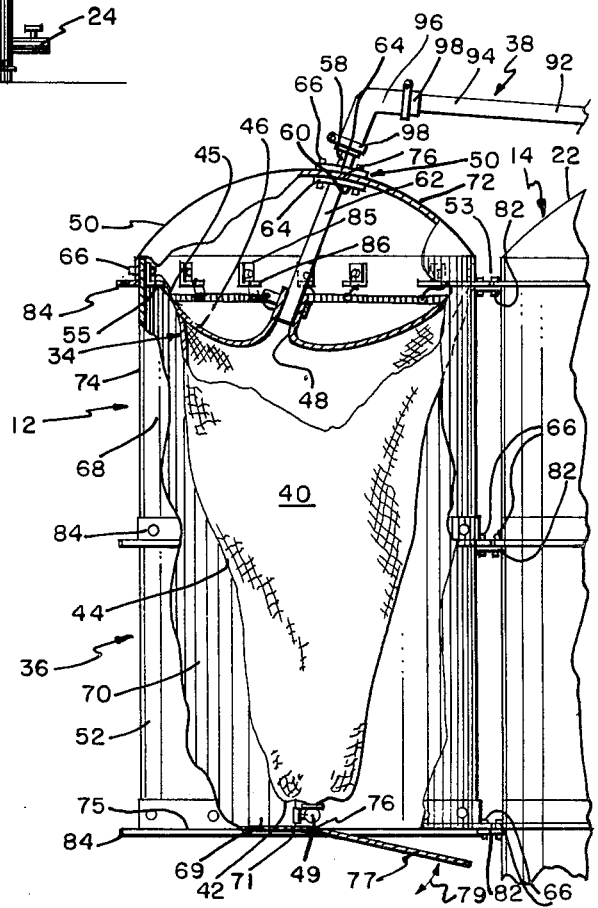
FIG. 3 is an enlarged, fragmentary side elevational view of the improved breather bag apparatus connected to the silo structure with portions thereof broken away for clarity.

As shown in FIGS. 2 and 3, the bag mounting assembly 36 includes a support connector assembly 50 connected to a downwardly depending protector shell member 52 which is connected to the silo structure 14 by a support bracket assembly 53, and a bag support assembly 55. The support connector assembly 50 includes: (1) a top conduit support member 58; (2) a central shell support flange 60; and (3) a bag support member 62. The central shell support flange 60 includes two adjacent connector plates 64 each formed with spaced holes about its periphery for connection by nut and bolt members 66 to clamp the protector shell member 52 therebetween.

The protector shell member 52 is preferably of a fiberglass construction and formed in two sections being an upper shell dome section 68 and a lower shell wall section 70 having an open end 69 covered by a closure member 71. The shell dome section 68 includes a top wall 72 integral with a cylindrical sidewall portion 74 and is formed in half sections for ease of conveyance and shipping. The top wall 72 is formed with a central hole 76 to be connected by the nut and bolt members 66 to the shell support flange 60 as shown in FIG. 3. A lower peripherial edge of the sidewall portion 74 is to be connected by nut and bolt members 66 to an upper edge portion of the lower shell wall section 70 (FIG. 3).

The shell wall section 70 resembles an open cylinder also formed in two half sections for ease of conveyance and shipping and extends downwardly beyond the breather bag member 40 to provide protection thereto.

The closure member 71 is preferably constructed of a wire screen material to permit the free flow of air but keep birds, squirrels, etc. from access to the bag member 40 to prevent damage thereto. The closure member 71 is formed with a stationary section 75 connected by a hinge member 76 to an access door section 77. As shown in FIG. 3, the access door section 77 is movable as shown by an arrow 79 to permit access to the drainage valve 49. A conventional lock mechanism can be used to hold the access door section 77 in the normal, horizontal usage position.

The support bracket assembly 53 includes three, spaced connector assemblies 80 each including (1) a mounting bracket 82 secured by nut and bolt members 66 to the silo structure 14 and to support angle members 84 which are bolted to and surround the protector shell member 52.

Figure 4:
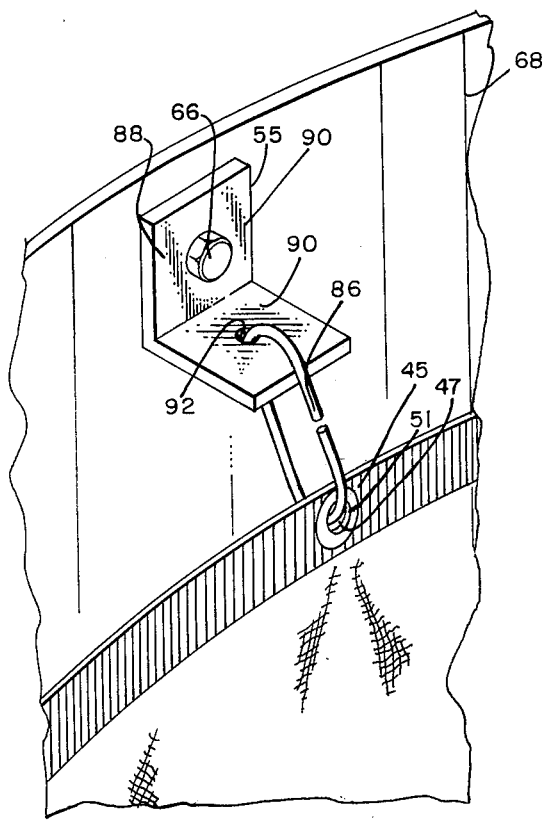
FIG. 4 is an enlarged fragmentary perspective view of a portion of a bag support assembly of the improved breather bag apparatus of this invention.
Figure 5:
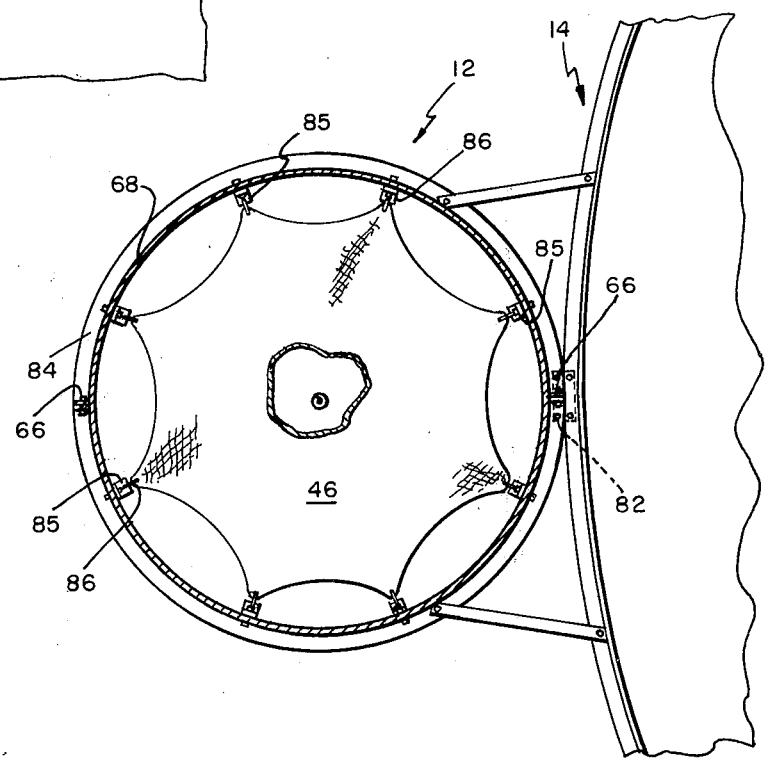
FIG. 5 is an enlarged fragmentary sectional view taken along line 5—5 in FIG. 2.

As shown in FIGS. 4 and 5, the bag support assembly 55 includes a plurality of spaced bag support members 85 secured to the upper inner wall of the upper shell dome section 68 by nut and bolt members 66 and to the bag member 40 by respective connector rings 86 to hold the top wall 46 of the bag member 40 in a generally horizontal condition.

Each bag support member 85 is of L-shape with a short leg 88 secured against the upper shell dome section 68 and a long leg 90 having a hole 92 therein to receive a portion of a conenctor ring 86.

As seen in FIG. 4, each connector ring 86 is of oblong shape and usable similar to a chain link to be trained through a respective hole 92 in the bag support member 85 and adjacent grommet member 51.

The conduit connector assembly 38 includes a conduit member 94 having conduit connector elbows 96 secured to each outer ends thereof which, in turn, are secured to adjacent structures. More particularly, the conduit member 94 includes an inclined main body 92 having outer end portions connected to the connector elbows 96 by clamp members 98. One conduit connector elbow 96 is connected by a clamp member 98 to the conduit support member 58 of the support connector assembly 50. The other one of the conduit connector elbows 96 is connected by a clamp member 98 to a conduit member 101 through the top wall 22 of the silo structure 14 about the second opening 32. A screen member may be bolted with the other conduit connector elbow 96 to prevent material within the silo structure 14 from being carried into the breather bag member 40.

USE AN OPERATION OF THE INVENTION

In the use and operation of the improved breather bag apparatus 12 of this invention, it is noted how the protector shell member 52 is constructed of four sections for ease of crating and shipping to the desired location. The assembly procedure of the improved breather bag apparatus 12 is obvious in light of the description and drawings submitted herein.

It is noted that the interior space of the silo structure 14 is connected by the conduit connector assembly 38 to the interior of the bag member 40 in a sealed manner. This provides free flow of air and gases therebetween to allow compensation for differences in atmospheric pressure and that created in the silo structure 14. The natural changes in temperature causes the bag member 40 to expand and contract plus any fluids therein to condense and vaporize.

It has been known that air and stored feed do not mix as oxidation would occur with rapid spoilage of the feed material. The problem solved by this invention is to compensate for increased pressures in the silo structure 14 created by temperature during the sunlight hours. At night, the cool temperature creates a vacuum type pressure on the walls of the silo structure 14 creating moire potential damage.

It is noted that the bag support assembly 55 is of extreme importance in the manner the bag support members 85 hold the bag member 40. It has been found that the upper portion of the bag member 40 needs to be held in the spread position to prevent collapse of same about the inlet opening 48 into the bag mounting assembly 36. This collapse is caused by vacuum pressure in the bag member 40 and, if the inlet opening 48 is closed, the purpose of the breather bag apparatus 12 is defeated.

Another important feature of this invention is the closure member 71 which can be seen through to observed the condition of the bag member 40 but prevents birds, squirrels, etc. from doing damage thereto. The access door section 77 can be opened to actuate the drainage valve 49 to remove any fluid from the bag member 40.

Still, another important features is the incline of the main body 92 of the conduit member 94 so that condensed fluid therein will flow back into the silo structure 14 to keep the material therein moist.

The improved breather bag apparatus of this invention is simple to construct, easy to assemble, constructed of durable and corrosion resistant materials, and reliable in operation. The open bottom wall of the protector shell member allows one to observe the condition of the bag member as a completely collasped bag member would indicate a leak in the system. Also, the closure member keeps out birds, squirrels, etc. to prevent damage to the bag member but access to the drainage valve to release any fluids in the bag member.

While the invention has been described in conjunction with preferred specific embodiments thereof, it will be understood that this description is intended to illustrate and not to limit the scope of the invention, which is defined by the following claims:

I claim:

1. A breather bag apparatus connected to a material storage structure operable to allow for expansion and contraction of gases in the storage structure, comprising:
   (a) a bag assembly having a flexible bag member that expands and contracts under gaseous pressures;
   (b) a bag mounting assembly secured to the storage structure and surrounding said bag member in a protective manner;
   (c) a conduit connector assembly connected at one end to said bag member and at another end to the storage structure to provide free flow of gases therebetween;
   (d) said conduit connector assembly having a conduit member with a main body that is inclined downwardly from said bag member toward the storage structure whereby any fluids condensed in said main body flows into the storage structure;
   (e) said bag mounting assembly including a support connector member and a protector shell member connected to said support connector member;
   (f) said support connector member connected to said bag member and said conduit connector assembly for flow of gases therebetween; and
   (g) said protector shell member encloses said bag member on all sides thereof and wherein said bag member acts similar to a diaphragm member to equalize pressures between the atmosphere and interior of the storage structure and prevent air from entering the silo structure and said bag member is protected on all sides and top thereof but said bag member is readily observed from below to monitor condition thereof.

2. A breather bag apparatus as described in claim 1, wherein:
   (a) said bag member including a valve member at a lower area thereof used to selectively drain any collected, condensed fluids therefrom periodically; and
   (b) said protector shell member includes a closure member at a lower end thereof to prevent birds, squirrels, etc. from access thereto.

3. A breather bag apparatus as described in claim 2 wherein:
   (a) said closure member having an access door to permit access to said valve member.

4. A breather bag apparatus as described in claim 3, wherein:
   (a) said closure member constructed of a screen material to permit observation of the condition of said bag member.

5. A breather bag apparatus as described in claim 1, wherein:
   (a) said bag mounting assembly having a support bracket assembly secured to said protector shell member and the storage structure and a bag support assembly to connect said bag member to said protector shell member.

6. A breather bag apparatus as described in claim 5, wherein:
   (a) said bag support assembly having a plurality of spaced bag support members connect to an upper periphery of said bag member to hold same in a generally horizontal position to prevent collapse of said bag member about said support connector member.

7. A breather bag apparatus as described in claim 6, wherein:
   (a) said bag support assembly includes a plurality of connector rings with each of said connector rings mounted between a respective one of said bag support members and a portion of said bag member.

* * * * *